(12) United States Patent
Tamaoka et al.

(10) Patent No.: US 11,661,511 B2
(45) Date of Patent: *May 30, 2023

(54) PRODUCTION METHOD OF POLYACETAL RESIN COMPOSITION

(71) Applicant: Polyplastics Co., Ltd., Tokyo (JP)

(72) Inventors: Akihiro Tamaoka, Shizuoka (JP); Hatsuhiko Harashina, Shizuoka (JP); Tomohiro Monma, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/593,231

(22) PCT Filed: Mar. 10, 2020

(86) PCT No.: PCT/JP2020/010201
§ 371 (c)(1),
(2) Date: Sep. 13, 2021

(87) PCT Pub. No.: WO2020/217752
PCT Pub. Date: Oct. 29, 2020

(65) Prior Publication Data
US 2022/0089858 A1    Mar. 24, 2022

(30) Foreign Application Priority Data
Apr. 26, 2019   (JP) ............................. JP2019-085375

(51) Int. Cl.
| | |
|---|---|
| *C08L 59/00* | (2006.01) |
| *C08K 5/098* | (2006.01) |
| *C08K 5/25* | (2006.01) |
| *C08K 5/3445* | (2006.01) |

(52) U.S. Cl.
CPC .............. *C08L 59/00* (2013.01); *C08K 5/098* (2013.01); *C08K 5/25* (2013.01); *C08K 5/3445* (2013.01); *C08L 2201/08* (2013.01); *C08L 2203/30* (2013.01)

(58) Field of Classification Search
None
See application file for complete search history.

(56) References Cited

U.S. PATENT DOCUMENTS

| | | | |
|---|---|---|---|
| 6,753,363 B1 | 6/2004 | Harashina | |
| 2007/0054998 A1* | 3/2007 | Harashina | ................ C08K 5/25 524/189 |
| 2007/0073007 A1 | 3/2007 | Harashina | |
| 2010/0093901 A1 | 4/2010 | Kawaguchi et al. | |
| 2015/0299544 A1 | 10/2015 | Markgarf et al. | |
| 2016/0280852 A1* | 9/2016 | Masuda | .................... C08G 2/28 |
| 2021/0355314 A1 | 11/2021 | Tamaoka et al. | |

FOREIGN PATENT DOCUMENTS

| | | | | |
|---|---|---|---|---|
| EP | 2098569 A1 | * | 9/2009 | .............. C08L 59/04 |
| JP | 2003-192812 A | | 7/2003 | |
| JP | 2005-162913 A | | 6/2005 | |
| JP | 2005-163019 A | | 6/2005 | |
| JP | 2005-264102 A | | 9/2005 | |
| JP | 2006-045489 A | | 2/2006 | |
| JP | 2006-257166 A | | 9/2006 | |
| JP | 2008-031348 A | | 2/2008 | |
| JP | 2008-156489 A | | 7/2008 | |
| JP | 2008-260874 A | | 10/2008 | |
| JP | 2009-286874 A | | 12/2009 | |
| JP | 2010-006903 A | | 1/2010 | |
| JP | 2013-237742 A | | 11/2013 | |
| JP | 2015-078387 A | | 4/2015 | |
| JP | 2015-514840 A | | 5/2015 | |
| JP | 2016-089069 A | | 5/2016 | |
| JP | 2017-082098 A | | 5/2017 | |
| JP | 2019-065233 A | | 4/2019 | |
| JP | 2020-100713 A | | 7/2020 | |
| WO | WO 2001/05888 A1 | | 1/2001 | |
| WO | WO 2005/044917 A1 | | 5/2005 | |
| WO | WO 2005/049728 A1 | | 6/2005 | |
| WO | WO 2013/156227 A1 | | 10/2013 | |
| WO | WO 2019/167463 A1 | | 9/2019 | |

* cited by examiner

*Primary Examiner* — Satya B Sastri
(74) *Attorney, Agent, or Firm* — Knobbe, Martens, Olson & Bear, LLP

(57) ABSTRACT

A method for producing a polyacetal resin composition which allows for suppression of formaldehyde generation from a molded article to an extremely low level, and stable suppression of mold deposits during molding. The polyacetal resin composition contains: 100 parts by mass of a polyacetal polymer (A); 0.01 to 0.50 parts by mass of an aliphatic carboxylic acid hydrazide (B); 0.001 to 0.50 parts by mass of a hydantoin compound having two hydrazinocarbonylalkyl groups (C); and 0.001 to 0.30 parts by mass of an alkaline earth metal salt of aliphatic carboxylic acid (D), wherein the total amount of the components (B) and (C) with respect to 100 parts by mass of the polyacetal polymer (A) is 0.03 to 0.55 parts by mass, and the polyacetal polymer (A) is a polyacetal copolymer obtained by copolymerizing trioxane as a principal monomer (a) with a cyclic ether having at least one carbon-carbon bond as a comonomer (b) using a heteropolyacid represented by general formula (1) as a polymerization catalyst (c) to obtain a reaction product, and subsequently adding a carbonate of an alkali metal element or alkaline earth metal element (d) to the reaction product to deactivate the polymerization catalyst (c).

4 Claims, No Drawings

PRODUCTION METHOD OF POLYACETAL RESIN COMPOSITION

This application is the U.S. National Phase under 35 U.S.C. § 371 of International Application PCT/JP2020/010201, filed Mar. 10, 2020, designating the U.S., and published in Japanese as WO 2020/217752 on Oct. 29, 2020, which claims priority to Japanese Patent Application No. 2019-085375, filed Apr. 26, 2019, the entire content of which is incorporated herein by reference.

TECHNICAL FIELD

The present invention relates to a method for producing a polyacetal resin composition which has excellent processability and stability, and allows for significant suppression of formaldehyde generation from a molded article thereof, as well as stable suppression of mold deposits during molding.

BACKGROUND ART

Polyacetal resins have excellent properties, and molded articles thereof have been utilized in a wide range of fields. However, the polyacetal resins are susceptible to decomposition in a heated oxidizing atmosphere or under acidic or alkaline conditions due to their characteristic chemical structure. Therefore, one of the challenges regarding the polyacetal resins is to increase their thermal stability and reduce the generation of formaldehyde in the molding process or from their molded articles. When a polymer has low thermal stability, the polymer is likely to be decomposed by heating during processing steps such as extrusion and molding, resulting in the generation of materials which adhere to a mold (mold deposits) and degradation of the moldability and mechanical properties of the polymer.

The amount of formaldehyde generated from the polyacetal resin molded articles under normal conditions of use is extremely small, but the formaldehyde generated is chemically active and yields formic acid upon oxidation, which adversely affects the thermal resistance of the polyacetal resins. When the polyacetal resin molded articles are used in electric and/or electronic components, etc., formaldehyde or its oxidized product, i.e. formic acid, may corrode metal contact parts and cause discoloration and contact failure due to the adhesion of organic compounds.

Thus, in order to stabilize the polyacetal resins, an antioxidant and other stabilizers are added to the polyacetal resins. Known antioxidants to be added to the polyacetal resins include phenol compounds with steric hindrance (hindered phenols), amine compounds with steric hindrance (hindered amines) and the like, and melamine, polyamides, alkali metal hydroxides, alkaline earth metal hydroxides and the like have been used as other stabilizers. In addition, the antioxidant is usually used in combination with other stabilizers.

However, it is difficult to significantly reduce the formaldehyde generated, especially the formaldehyde generated from the molded articles, simply by adding such general-purpose stabilizers to the polyacetal resins with normal formaldehyde quality. Furthermore, in order to solve the problems mentioned above and reduce the amount of formaldehyde generated, polyacetal resin compositions blended with various compounds have been disclosed.

For example, a technology that involves the combination of a polyacetal resin having a specific end group with a hindered phenol antioxidant, a hydrazide compound and an isocyanate compound has been disclosed (Patent Document 1). Further, a technology that involves the coexistence of a hindered phenol antioxidant, a hydrazide compound and an alkaline earth metal salt of a specific carboxylic acid has also been disclosed (Patent Document 2).

Patent Document 1: Japanese Unexamined Patent Application, Publication No. 2009-286874

Patent Document 2: Japanese Unexamined Patent Application, Publication No. 2006-45489

DISCLOSURE OF THE INVENTION

Problems to be Solved by the Invention

According to the technology disclosed in the document 1, the mold deposits generated during the polyacetal resin molding can be reduced by a considerable level. However, although the technology is effective in reducing the mold deposits, in practice, it cannot sufficiently suppress the generation of formaldehyde. In addition, according to the technology disclosed in Document 2, although the effect of suppressing formaldehyde generation is exerted, the effect of suppressing the mold deposits is insufficient, and thus the technology disclosed in the document 2 is not a stable molding technology.

An object of the present invention is to provide a method for producing a polyacetal resin composition which allows for suppression of formaldehyde generation from a molded article to an extremely low level, and stable suppression of mold deposits during molding.

Means for Solving the Problems

The object of the present invention has been solved by the following.

A first aspect of the present invention relates to a method for producing a polyacetal resin composition, the polyacetal resin composition containing at least:

100 parts by mass of a polyacetal polymer (A); 0.01 to 0.50 parts by mass of an aliphatic carboxylic acid hydrazide (B); 0.001 to 0.50 parts by mass of a hydantoin compound having two hydrazinocarbonylalkyl groups (C); and 0.001 to 0.30 parts by mass of an alkaline earth metal salt of aliphatic carboxylic acid (D), wherein the total amount of the components (B) and (C) with respect to 100 parts by mass of the polyacetal polymer (A) is 0.03 to 0.55 parts by mass, and wherein the polyacetal polymer (A) is a polyacetal copolymer obtained by copolymerizing trioxane as a principal monomer (a) with one or more types of compounds selected from a cyclic ether having at least one carbon-carbon bond and a cyclic formal having at least one carbon-carbon bond as a comonomer (b) using a heteropolyacid represented by the following general formula (1) as a polymerization catalyst (c) to obtain a reaction product, adding a carbonate, hydrogen carbonate, or carboxylate of an alkali metal element or an alkaline earth metal element, or a hydrate thereof, or a hydroxide of an alkali metal element or an alkaline earth metal element (d) to the reaction product to obtain a mixture, and subjecting the mixture to melt kneading treatment to deactivate the polymerization catalyst (c),

$$H_m[M^1_x \cdot M^2_y O_Z] \cdot nH_2O \quad (1)$$

wherein in the formula (1), $M^1$ represents a central element consisting of one type or two types of elements selected from P and Si; $M^2$ represents at least one coordination element selected from W, Mo and V; x represents an integer of 1 or greater and 10 or less; y represents an integer of 6 or greater and 40 or less; z represents an integer of 10 or greater and 100 or less; m represents an integer of 1 or greater; and n represents an integer of 0 or greater and 50 or less.

A second aspect of the present invention relates to the method for producing a polyacetal resin composition according to the first aspect of the present invention, wherein the aliphatic carboxylic acid hydrazide (B) is sebacic acid dihydrazide. A third aspect of the present invention relates to the method for producing a polyacetal resin composition according to the first or second aspect of the present invention, wherein the alkaline earth metal salt of aliphatic carboxylic acid (D) is at least one selected from calcium stearate and calcium 12-hydroxystearate. A fourth aspect of the present invention relates to the method for producing a polyacetal resin composition according to any one of the first to third aspects of the present invention, wherein the hydantoin compound having two hydrazinocarbonylalkyl groups (C) is 1,3-bis(hydrazinocarbonoethyl)-5-isopropylhydantoin.

Effects of the Invention

The present invention provides a method for producing a polyacetal resin composition which allows for significant reduction of the amount of formaldehyde generated, and stable suppression of mold deposits during molding.

PREFERRED MODE FOR CARRYING OUT THE INVENTION

Hereinafter, an embodiment of the present invention will be described in detail.
<Polyacetal Polymer (A)>
A polyacetal polymer (A) used in the embodiment of the present invention is a polyacetal polymer obtained by copolymerizing trioxane, which is a cyclic trimer of formaldehyde, as a principal monomer (a) with one or more types of compounds selected from a cyclic ether having at least one carbon-carbon bond and a cyclic formal having at least one carbon-carbon bond as a comonomer (b) using a predetermined heteropolyacid as a polymerization catalyst (c) to obtain a reaction product, adding a predetermined component (d) to the reaction product to obtain a mixture, and subjecting the mixture to melt kneading treatment to deactivate the polymerization catalyst (c).
<<Principal Monomer (a)>>
The trioxane, which is the principal monomer (a), is generally obtained by reacting an aqueous formaldehyde solution in the presence of an acidic catalyst, and is used after purification through a process such as distillation. Trioxane for use in the polymerization should have as low a content as possible of impurities such as water, methanol, and formic acid, and the content of each of the impurities is preferably 10 ppm or less, for example.
<<Comonomer (b)>>
One or more types of compounds selected from a cyclic ether having at least one carbon-carbon bond and a cyclic formal having at least one carbon-carbon bond is used as the comonomer (b). Typical examples of the compound to be used as the comonomer (b) include 1,3-dioxolane, diethylene glycol formal, 1,4-butanediol formal, 1,3-dioxane, ethylene oxide, propylene oxide, epichlorohydrin, and the like.

Among these, in view of the stability of the polymerization, 1,3-dioxolane, diethylene glycol formal, 1,4-butanediol formal, 1,3-dioxane, and ethylene oxide are preferred.

Monofunctional cyclic ethers and cyclic formals having a substituent unit, such as butyl glycidyl ether and 2-ethylhexyl glycidyl ether, can also be used as the comonomer. Further, compounds having two polymerizable cyclic ether groups or cyclic formal groups such as diglycidyl ethers and diformals of alkylene glycols, for example, butanediol dimethylidene glyceryl ether, butanediol diglycidyl ether and the like, and compounds having three or more polymerizable cyclic ether groups or cyclic formal groups such as glycerin triglycidyl ether, trimethylolpropane triglycidyl ether, pentaerythritol tetraglycidyl ether, and the like may be used as the comonomer. A polyacetal copolymer having a branched structure or a cross-linked structure thus formed is also encompassed by the present invention.

In the embodiment of the present invention, the amount of the one or more types of compounds selected from a cyclic ether and a cyclic formal to be used as the comonomer (b) in terms of a proportion with respect to the total monomers (the total amount of the principal monomer and the comonomer) is preferably 0.1 to 20% by mass, and more preferably 0.2 to 10% by mass. When the amount of the comonomer is excessively small, the proportion of the labile end in the crude polyacetal polymer formed by the polymerization is increased and hence the stability of the crude polyacetal polymer may be impaired. When the amount of the comonomer is excessively large, the formed polymer may be soft, leading to a decrease in the melting point of the polyacetal polymer, which is unfavorable.
<<Polymerization Catalyst (c)>>
One of features of the embodiment of the present invention is the use of a heteropolyacid as the polymerization catalyst (c) in the production of the polyacetal copolymer as described above.

In the embodiment of the present invention, the heteropolyacid to be used as the polymerization catalyst (c) collectively refers to polyacids generated from different oxoacids through dehydrative condensation thereof, and has a mononuclear or polynuclear complex ion which can be formed by condensing condensation acid groups sharing oxygen atoms, with a specified heteroatom in its center. Such a heteronuclear condensed acid can be represented by the following general formula (1).

$$H_m[M^1_x \cdot M^2_y O_z] \cdot nH_2O \quad (1)$$

In the formula (1), $M^1$ represents a central element consisting of one type or two types of elements selected from P and Si;
$M^2$ represents at least one coordination element selected from W, Mo and V;
x represents an integer of 1 or greater and 10 or less; y represents an integer of 6 or greater and 40 or less; z represents an integer of 10 or greater and 100 or less; m represents an integer of 1 or greater; and n represents an integer of 0 or greater and 50 or less.

Specific examples of the heteropolyacid include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid, and the like. Among these, the heteropolyacid is preferably any one or more of silicomolybdic acid, silicotungstic acid, phosphomolybdic acid or phosphotungstic acid in light of the stability of the polymerization and the stability of the heteropolyacid per se.

In the present invention, the amount of the heteropolyacid used depends on the type of the heteropolyacid, and may be appropriately changed so as to regulate the polymerization reaction; the amount of the heteropolyacid is generally in the range of 0.05 to 100 ppm (hereinafter, ppm represents mass/mass ppm), and preferably 0.1 to 50 ppm with respect to the total amount of the monomers to be polymerized.

Incidentally, for heteropolyacids that act very strongly like phosphomolybdic acid, phosphotungstic acid, etc., an amount of the heteropolyacid of 0.1 to 10 ppm is sufficient for the polymerization. The fact that the copolymerization can occur even in the presence of such a minor amount of the catalyst is effective for minimizing unfavorable reactions caused by the catalyst, such as decomposition, depolymerization, etc. of the main chain of the polymer, and suppressing the formation of a labile formyl end group (—O—CH=O), a labile hemiformal end group (—O—CH$_2$—OH), etc., and is economically advantageous.

To allow the reaction to proceed homogeneously, the polymerization catalyst (c) is desirably used after dilution thereof in an inert solvent which has no adverse effect on the polymerization, and addition to the principal monomer and/or comonomer.
Examples of the inert solvent preferably include, but are not limited to: esters obtained by condensation of a low molecular weight carboxylic acid having 1 to 10 carbon atoms such as formic acid, acetic acid, propionic acid, or butyric acid and a low molecular weight alcohol having 1 to 10 carbon atoms such as methanol, ethanol, 1-propanol, 2-propanol, 1-butanol, 2-butanol, 2-methyl-1-propanol, 2-methyl-2-propanol, 1-pentanol, 3-methyl-1-butanol, or 1-hexanol; low molecular weight ketones having 1 to 10 carbon atoms such as acetone, 2-butanone, 2-pentanone, 3-pentanone, 2-hexanone, 3-hexanone, methyl isobutyl ketone, or methyl t-butyl ketone.

In light of their industrial availability and the like, methyl formate, ethyl formate, methyl acetate, ethyl acetate, butyl acetate, acetone, 2-butanone, and methyl isobutyl ketone are most preferred. The polymerization catalyst is dissolved in the above-mentioned inert solvent, suitably at a concentration of 1 to 30% by mass/mass, but is not limited thereto. In addition, a method is also preferred in which a predetermined amount of the polymerization catalyst is mixed beforehand with a partial or total amount of any one type or a plurality of types of the aforementioned principal monomer, comonomer, molecular weight modifier or the like, and this solution is added to the polymerization system to perform the polymerization.

<<Polymerization Method>>

In the embodiment of the present invention, the preparation of a crude polyacetal copolymer by the polymerization may be performed in the same equipment and process as those for conventionally known copolymerization of trioxane. Specifically, any of a batch-wise system, a continuous system and a semi-continuous system may be employed, and a method in which liquid monomers are used and solid powder aggregates of the polymer is obtained with the progress of the polymerization is commonly performed.

As for a polymerization apparatus used in the embodiment of the present invention, a reaction tank equipped with a stirrer which are in general may be used for batch-wise processes, and for continuous systems, co-kneaders, twin-screw continuous extrusion blenders, twin-puddle continuous blenders, and other continuous polymerization apparatuses for trioxane, etc. which have been proposed to date may be used. Moreover, two or more types of polymerization reactors may be used in combination.

The polymerization method is not particularly limited; nonetheless, a process in which trioxane, the comonomer(s) and the heteropolyacid as the polymerization catalyst are sufficiently mixed beforehand while maintaining them in a liquid phase state and the resulting reaction ingredient liquid mixture is fed into a polymerization apparatus to perform the copolymerization reaction, as previously proposed, allows for a reduction of the amount of the catalyst required, and is consequently advantageous and more suitable for obtaining a polyacetal copolymer that generates less formaldehyde. The polymerization temperature may be in the range of 60 to 120° C.

In the embodiment of the present invention, when the principal monomer (a) and the comonomer (b) as mentioned above are polymerized to prepare the polyacetal copolymer, a known chain transfer agent, e.g. a low molecular weight linear acetal such as methylal, and the like may be added to control the degree of polymerization.

In addition, the polymerization reaction is desirably performed in the substantial absence of active-hydrogen-bearing impurities, e.g. water, methanol, formic acid, etc., for example, under a condition in which water, methanol, and formic acid are each present in a concentration of 10 ppm or less. To this end, it is desirable that the trioxane, cyclic ether and/or cyclic formal that are prepared so as to contain as minimal an amount as possible of these impurity components are used as the principal monomer or the comonomer.

<<Stabilization Treatment of Crude Polyacetal Polymer: Including Deactivation Treatment of Polymerization Catalyst (c)>>

In the embodiment of the present invention, the polyacetal polymer (crude polyacetal polymer) which is obtained by the polymerization as described above, that is, a polyacetal polymer which contains the polymerization catalyst and has a labile moiety at its end, is stabilized by adding a carbonate, hydrogen carbonate, or carboxylate of an alkali metal element or an alkaline earth metal element, or a hydrate thereof, or a hydroxide of an alkali metal element or an alkaline earth metal element (d) to the crude polyacetal polymer to obtain a mixture, and subjecting the mixture to melt kneading to deactivate the polymerization catalyst, and additionally to decrease the labile end group included in the polyacetal polymer (crude polyacetal polymer). Hereinafter, the treatment described above, including the deactivation treatment of the polymerization catalyst (c), may be also referred to as "stabilization treatment".

Hereinafter, the carbonate, hydrogen carbonate, or carboxylate of an alkali metal element or an alkaline earth metal element, or a hydrate thereof, or the hydroxide of an alkali metal element or an alkaline earth metal element may be also referred to as component (d). Such stabilization treatment can be performed more easily and efficiently by adding the component (d) directly to the crude polyacetal copolymer obtained by the copolymerization reaction, without washing, etc., and allowing the treatment to proceed.

[Carbonate, Hydrogen Carbonate, or Carboxylate of Alkali Metal Element or Alkaline Earth Metal Element, or Hydrate Thereof: Component (d-1)]

When the component (d) is a carbonate, hydrogen carbonate, or carboxylate of an alkali metal element or an alkaline earth metal element, or a hydrate thereof (hereinafter, may be also referred to as component (d-1)), the component (d) is preferably any of carbonate, hydrogen carbonate, aliphatic carboxylate, unsaturated aliphatic carboxylate, or aromatic carboxylate of an alkali metal element or an alkaline earth metal element, or a hydrate thereof.

Specifically, examples of the preferable component (d-1) include, but are not limited to, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, barium carbonate, lithium hydrogen carbonate, sodium hydrogen carbonate, potassium hydrogen carbonate, cesium hydrogen carbonate, lithium formate monohydrate, sodium formate, potassium formate, rubidium formate, cesium formate, magnesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, barium acetate, sodium laurate, potassium laurate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate hemihydrate, disodium malate trihydrate, dilithium tartrate monohydrate, disodium tartrate dihydrate, potassium hydrogen tartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbate, potassium sorbate, monosodium fumarate, lithium benzoate, sodium benzoate, potassium benzoate, cesium benzoate, potassium hydrogen phthalate, lithium salicylate monohydrate, sodium salicylate, potassium salicylate, and the like.

In view of industrial availability thereof, etc., the component (d-1) is preferably lithium carbonate, anhydrous sodium carbonate, sodium carbonate monohydrate, sodium carbonate decahydrate, potassium carbonate, magnesium carbonate, calcium carbonate, barium carbonate, lithium hydrogen carbonate, sodium hydrogen carbonate, potassium hydrogen carbonate, lithium formate monohydrate, sodium formate, potassium formate, magnesium formate, calcium formate, barium formate, lithium acetate, sodium acetate, sodium acetate trihydrate, potassium acetate, calcium acetate monohydrate, magnesium acetate tetrahydrate, barium acetate, sodium laurate, potassium laurate, lithium stearate, sodium stearate, potassium stearate, magnesium stearate, calcium stearate, monosodium succinate, disodium succinate, disodium succinate hexahydrate, dipotassium succinate, lithium citrate tetrahydrate, monosodium citrate, trisodium citrate, trisodium citrate dihydrate, sodium aspartate monohydrate, disodium glutamate, sodium acrylate, potassium acrylate, sodium sorbate, potassium sorbate, monosodium fumarate, lithium benzoate, sodium benzoate, potassium benzoate, potassium hydrogen phthalate, lithium salicylate monohydrate, sodium salicylate, or potassium salicylate.

Furthermore, in light of the color hue of the polyacetal copolymer after the deactivation of the polymerization catalyst (c), the component (d-1) is more preferably sodium formate, sodium acetate, anhydrous sodium carbonate, sodium carbonate monohydrate, sodium carbonate decahydrate, sodium hydrogen carbonate, disodium succinate hexahydrate, sodium laurate, or sodium stearate.

When the component (d) is the carbonate, hydrogen carbonate, or carboxylate of an alkali metal element or an alkaline earth metal element, or a hydrate thereof, i.e., the component (d-1), one type of the component (d-1) may be used, and a plurality of types of the components (d-1) may be used in combination, and the plurality of types of the components (d-1) may be used in the form of a mixture and double salt thereof. Examples of the double salt include sodium sesquicarbonate, which consists of sodium carbonate and sodium hydrogen carbonate.

When the component (d) is the carbonate, hydrogen carbonate, or carboxylate of an alkali metal element or an alkaline earth metal element, or a hydrate thereof, i.e., the component (d-1), the content of the component (d-1) is not particularly limited, and preferably adjusted as appropriate according to ($\alpha$) the amount of the catalyst remaining in the polymer, ($\beta$) the type and amount of the labile end group formed depending on the conditions of the polymerization, ($\gamma$) the degree of the activity of the component (d) and the treatment conditions (temperature, time, contact speed, etc.), and the like.

More specifically, the content of the component (d-1) is preferably very low, and is preferably 0.002 to 1.0 milliequivalents, more preferably 0.006 to 0.34 milliequivalents, even more preferably 0.009 to 0.17 milliequivalents, and still more preferably 0.009 to 0.10 milliequivalents with respect to 1 kg of the crude polyacetal polymer obtained by the copolymerization reaction.

The content of the component (d-1) of 1.0 milliequivalents or less with respect to 1 kg of the crude polyacetal copolymer can yield the b-value of the polyacetal polymer after the deactivation of the polymerization catalyst (c) of 2.0 or less. In addition, the content of the component (d-1) of 0.34 milliequivalents or less with respect to 1 kg of the crude polyacetal polymer can yield the b-value of the polyacetal copolymer pellet after the deactivation of the polymerization catalyst (c) of 0.4 or less.

It should be noted that the b-value as used herein refers to a value displayed when a measurement is performed with the use of a colorimeter SE-2000 (manufactured by Nippon Denshoku Industries Co., Ltd.) by placing a predetermined amount of pellets in a cell for pellet measurement (round cell), placing the cell on a sample stand, and covering the cell with a cover.

When the amount of the component (d-1) is in excess, the color hue of the polyacetal copolymer after the deactivation of the polymerization catalyst (c) may be impaired, whereas an insufficient amount of the component (d-1) would fail to achieve a sufficient efficiency of the deactivation or sufficient stabilization of the labile end, which is unfavorable.

[Hydroxide of Alkali Metal Element or Alkaline Earth Metal Element: (d-2 Component)]

When the component (d) is a hydroxide of an alkali metal element or an alkaline earth metal element (hereinafter, may be also referred to as component (d-2)), the component (d-2) is most suitably lithium hydroxide, sodium hydroxide, potassium hydroxide, magnesium hydroxide, calcium hydroxide, barium hydroxide, or the like, but is not limited thereto.

In particular, in light of the color hue of the polyacetal polymer after the deactivation of the polymerization catalyst (c), the component (d-2) is preferably a hydroxide of an alkali metal, and more preferably lithium hydroxide or sodium hydroxide. One type of the component (d-2) may be used, and a plurality of types of the components (d-2) may be used in combination, and the plurality of types of the components (d-2) may be used in the form of a mixture thereof.

When the component (d) is the hydroxide of an alkali metal element or an alkaline earth metal element, i.e., the component (d-2), the content of the component (d-2) is not particularly limited, and preferably adjusted as appropriate according to (α) the amount of the catalyst remaining in the polymer, (β) the type and amount of the labile end group formed depending on the conditions of the polymerization, (γ) the degree of the activity of the component (d) and the treatment conditions (temperature, time, contact speed, etc.), and the like More specifically, the content of the component (d-2) is preferably very low, and is preferably 0.001 to 0.25 milliequivalents, more preferably 0.002 to 0.10 milliequivalents, and even more preferably 0.002 to 0.025 milliequivalents with respect to 1 kg of the crude polyacetal copolymer obtained by the copolymerization reaction.

The upper limit of the content of the component (d-2) affects the color hue (b-value) in the pellets, and the content of the component (d) of 0.25 milliequivalents or less with respect to 1 kg of the crude polyacetal polymer can yield the b-value of the polyacetal polymer after the deactivation of the polymerization catalyst (c) of 2.0 or less.

In addition, adjustment of the content of the component (d-2) with respect to 1 kg of the crude polyacetal polymer to 0.10 milliequivalents or less can yield the b-value of the polyacetal polymer after the deactivation of the polymerization catalyst (c) of 1.0 or less.

When the amount of the component (d-2) is in excess, the color hue of the polyacetal copolymer after the deactivation of the polymerization catalyst (c) may be impaired, whereas an insufficient amount of the component (d-2) would fail to achieve a sufficient efficiency of the deactivation or sufficient stabilization of the labile end, which is unfavorable.

[Deactivation Method of Catalyst (c)]

In the embodiment of the present invention, the content of the component (d) used in the deactivation treatment of the catalyst is preferably very low, but it is extremely difficult to homogeneously disperse a very minor amount of the component (d) throughout the crude polyacetal polymer. Thus, the addition of the component (d) is preferably performed according to any one of the following (α) to (γ).

(α) A solution of the component (d) is prepared, and the solution is added directly to the crude polyacetal polymer obtained by the copolymerization reaction.
(β) A powder of the stabilization-treated polyacetal polymer is impregnated with a solution of the component (d), followed by ensuring the uniform dispersion thereof, and the powder after the dispersion is added to the crude polyacetal polymer. (γ) The component (d) in a solid state is uniformly dispersed in a powder of the stabilization-treated polyacetal polymer, and then the powder after the dispersion is added to the crude polyacetal polymer.

When the impregnation of the powder of the polyacetal polymer is performed, common mixing machines such as horizontal cylindrical type, V type, ribbon type, paddle type, high-speed flow type, etc. can be used for mixing. Incidentally, the mixture may be subjected to melting treatment directly, or after removal of a solvent through distillation with the help of heating, a reduced pressure, etc. Alternatively, a deactivator/stabilizer solution may be fed from the feed port and/or the middle of the extruder by injection or other means. In this case, the deactivator/stabilizer solution may be fed in portions in multiple stages.

The very minor amount of the component (d) can be dispersed entirely and uniformly by adding the component (d) as described above, resulting in the achievement of the b-value of the polyacetal polymer after the deactivation of the polymerization catalyst (c) of 2.0 or less as determined using the colorimeter.

In the embodiment of the present invention, in performing the deactivation treatment of the catalyst after the polymerization, a less amount of the unreacted monomer is more favorable, and the amount of the unreacted monomer (referring to the sum of the principal monomer and the comonomer) in the crude polymer is 10% by mass or less, more preferably 5% by mass or less, and particularly preferably 3% by mass or less. This makes it possible to achieve a particularly desirable aspect of the invention, in which the crude polyacetal polymer produced by the polymerization is treated without washing.

To reduce the unreacted monomer, a general approach is to increase the conversion above a certain level, and in the embodiment of the present invention, this increase in the conversion is easily achieved by adjusting the amount of the catalyst used and the polymerization time (or the residence time in a continuous system) as appropriate, and the use of the highly active heteropolyacid catalyst enables the increase in the conversion to be achieved even by a minor amount of catalyst within a comparatively short period of time.

Alternatively, some of the residual monomer may be removed by evaporation and vaporization after the copolymerization reaction to achieve a predetermined amount of the residual monomer. Note that the unreacted trioxane and comonomer collected as gas during or after the copolymerization can be liquefied and reused directly as a part of the raw material monomer, which renders the process more economical.

In addition, if necessary, conventionally known catalyst deactivators and treatment agents for decomposing a labile end can be used in combination with the component (d) described above.

In the embodiment of the present invention, the addition of the component (d), which functions as a deactivation treatment agent for the polymerization catalyst (c), may be carried out either before or after the melting of the crude polyacetal polymer, or at both stages. In addition, the addition of the component (d) may be divided and performed in multiple stages.

Moreover, when the component (d) is added as the deactivation treatment agent, it is preferable that the crude polymer is in the form of a fine powdery granule. To this end, a reactor preferably has a function of sufficiently pulverizing the lumpy polymerization product, but the reaction product after the polymerization may be pulverized separately using a pulverizer.

The particle size of the crude polymer in the stabilization treatment is such that at least 90% by mass or more of the crude polymer have a particle diameter of 10 mm or less, preferably 4 mm or less, and even more preferably 2 mm or less.

<<Properties of Polyacetal Polymer (A)>>

The molecular weight of the polyacetal polymer (A) used in the embodiment of the present invention is not particularly limited, but the polyacetal polymer (A) preferably has a weight average molecular weight of about 10,000 to 400,000 as determined by size exclusion chromatography (SEC) in terms of polymethyl methacrylate (PMMA) equivalent. Additionally, the polyacetal polymer (A) preferably has a melt index (measured according to ASTM-D1238 at 190° C. under a load of 2.16 kg), which is an index of the flowability of the resin, of 0.1 to 100 g/10 min, and more preferably 0.5 to 80 g/10 min.

The polyacetal polymer (A) used in the embodiment of the present invention particularly preferably has specific end properties. Specifically, the amount of a hemiformal end group in the polyacetal polymer (A) is 1.0 mmol/kg or less, the amount of a formyl end group in the polyacetal polymer (A) is 0.5 mmol/kg or less, and the amount of a labile end in the polyacetal polymer (A) is 0.5% by mass or less.

As used herein, the hemiformal end group is represented by —$OCH_2$—OH, and may be also referred to as a hydroxymethoxy group or a hemiacetal end group. The formyl end group is represented by —O—CH=O. The amount of such hemiformal and formyl end groups can be determined by $^1$H-NMR measurement, and a specific measurement method therefor can refer to the method described in Japanese Unexamined Patent Application, Publication No. 2001-11143.

Further, the amount of the labile end refers to the amount of a moiety that is present in the end portion of the polyacetal polymer and is labile to heat and/or a base and susceptible to decomposition. The amount of such a labile end is determined according to the following quantitative determination method and expressed as % by mass relative to the polyacetal polymer: specifically, 1 g of the polyacetal polymer together with 100 mL of a 50% (by volume) aqueous methanol solution containing 0.5% (by volume) ammonium hydroxide is charged into a pressure-resistant sealed vessel, the mixture is heat-treated at 180° C. for 45 min, followed by cooling, and the vessel is opened to obtain a solution, and the amount of formaldehyde that has been generated via the decomposition of the polyacetal polymer and dissolved in the solution is quantitatively determined.

The polyacetal polymer (A) used in the embodiment of the present invention preferably has the hemiformal end group in an amount of 1.0 mmol/kg or less, and more preferably 0.6 mmol/kg or less. In addition, the polyacetal polymer (A) has the formyl end group in an amount of preferably 0.5 mmol/kg or less, and more preferably 0.1 mmol/kg or less.

Further, the polyacetal polymer (A) preferably has the labile end in an amount of preferably 0.5% by mass or less, and more preferably 0.3% by mass or less. The lower limits of the amounts of the hemiformal end group, the formyl end group, and the labile end are not particularly limited.

The polyacetal polymer (A) having the specific end properties as described above can be produced by reducing impurities in the monomer and comonomer, selecting a production process and optimizing its production conditions.

In the following, as a method for producing a polyacetal polymer (A) having the specific end properties that satisfy the requirements of the present invention, for example, the method described in Japanese Unexamined Patent Application, Publication No. 2009-286874 may be employed. However, the method for producing such a polyacetal polymer (A) is not limited to this method.

In the embodiment of the present invention, a polyacetal resin having a branched or cross-linked structure may be added to the polyacetal polymer (A) and used, in which case the amount of the former to be added is 0.01 to 20 parts by mass, and particularly preferably 0.03 to 5 parts by mass with respect to 100 parts by mass of the polyacetal polymer (A).

<Aliphatic Carboxylic Acid Hydrazide (B)>

An aliphatic carboxylic acid hydrazide (B) used in the embodiment of the present invention is exemplified by adipic acid dihydrazide, sebacic acid dihydrazide, dodecanedioic acid dihydrazide, stearic acid hydrazide, and the like. Sebacic acid dihydrazide may be mentioned as a preferable one; it scavenges formaldehyde and furthermore, when used in combination with a hydantoin compound having two hydrazinocarbonylalkyl groups, can significantly reduce mold deposits generated from the aliphatic carboxylic acid hydrazide.

In the embodiment of the present invention, the amount of the component (B) added with respect to 100 parts by mass of the polyacetal polymer (A) is 0.01 to 0.50 parts by mass, and preferably 0.02 to 0.30 parts by mass.

<Hydantoin Compound Having Two Hydrazinocarbonylalkyl Groups (C)>

A hydantoin compound having two hydrazinocarbonylalkyl groups (C) (hereinafter, may be occasionally abbreviated to "hydantoin compound") in the embodiment of the present invention is exemplified by 1,3-bis(hydrazinocarbonoethyl)hydantoin, 1,3-bis(hydrazinocarbonoethyl)-5-methylhydantoin, 1,3-bis(hydrazinocarbonoethyl)-5,5-dimethylhydantoin, 1,3-bis(hydrazinocarbonoethyl)-5-isopropylhydantoin, and the like, and the hydantoin compound may have one or two substituent(s) (a linear or branched alkyl group having 1 to 6 carbon atoms such as a methyl group, an aryl group having 6 to 10 carbon atoms such as a phenyl group, and the like) in 5-position of the hydantoin, and the two substituents in 5-position may form a ring together with the carbon atom in 5-position. Preferably, 1,3-bis(hydrazinocarbonoethyl)-5-isopropylhydantoin is used.

This hydantoin compound (C) of the embodiment of the present invention suppresses mold deposits when used in combination with the aliphatic carboxylic acid hydrazide (B) of the embodiment of the present invention. In particular, significant effects can be found when used in combination with sebacic acid dihydrazide.

In the embodiment of the present invention, the amount of the hydantoin compound (C) to be added with respect to 100 parts by mass of the polyacetal polymer (A) is 0.001 to 0.50 parts by mass, and preferably 0.01 to 0.30 parts by mass.

In the embodiment of the present invention, when both the aliphatic carboxylic acid hydrazide (B) and the hydantoin compound (C) are contained, the effects of the invention can be exerted, but the total amount of the aliphatic carboxylic acid hydrazide (B) and the hydantoin compound (C) with respect to 100 parts by mass of the polyacetal polymer (A) is preferably 0.03 to 0.55 parts by mass. In addition, the mass ratio of the components (B) and (C) contained is preferably (B):(C) =10:90 to 99:1.

<Alkaline Earth Metal Salt of Aliphatic Carboxylic Acid (D)>

An aliphatic carboxylic acid that constitutes an alkaline earth metal salt of aliphatic carboxylic acid (D) of the embodiment of the present invention may be a saturated aliphatic carboxylic acid or an unsaturated aliphatic carboxylic acid.

Such an aliphatic carboxylic acid may be exemplified by monovalent or divalent aliphatic carboxylic acids having 10 or more carbon atoms, for example, monovalent saturated aliphatic carboxylic acids having 10 or more carbon atoms [saturated aliphatic carboxylic acids having 10 to 34 carbon atoms (preferably, saturated aliphatic carboxylic acids having 10 to 30 carbon atoms) such as capric acid, lauric acid, myristic acid, pentadecylic acid, palmitic acid, stearic acid, arachic acid, behenic acid, and montanic acid, and the like], monovalent unsaturated aliphatic carboxylic acids having 10 or more carbon atoms [unsaturated aliphatic carboxylic acids having 10 to 34 carbon atoms (preferably, unsaturated aliphatic carboxylic acids having 10 to 30 carbon atoms) such as oleic acid, linoleic acid, linolenic acid, arachidonic acid, and erucic acid, and the like], divalent aliphatic carboxylic acids (dibasic aliphatic carboxylic acids) having 10 or more carbon atoms [divalent saturated aliphatic carboxylic acids having 10 to 30 carbon atoms (preferably, divalent saturated aliphatic carboxylic acids having 10 to 20 carbon atoms) such as sebacic acid, dodecanoic acid, tetradecanoic acid, and thapsic acid, and the like], divalent unsaturated aliphatic carboxylic acids having 10 or more carbon atoms [divalent unsaturated aliphatic carboxylic acids having 10 to 30 carbon atoms (preferably, divalent unsaturated aliphatic carboxylic acids having 10 to 20 carbon atoms) such as decenedioic acid and dodecenedioic acid, and the like].

In addition, the aliphatic carboxylic acids mentioned above include aliphatic carboxylic acids having a part of the hydrogen atoms thereof substituted with a substituent such as a hydroxyl group and hence having one or a plurality of hydroxyl groups within the molecule (for example, hydroxy-saturated aliphatic carboxylic acids having 10 to 26 carbon atoms such as 12-hydroxystearic acid, and the like), and may additionally contain aliphatic carboxylic acids having a somewhat different number of carbon atoms depending on the accuracy of the purification.

In the embodiment of the present invention, the alkaline earth metal is preferably calcium or magnesium, and particularly preferably calcium. In the embodiment of the present invention, examples of a particularly preferred alkaline earth metal salt of aliphatic carboxylic acid include calcium stearate, and calcium 12-hydroxystearate.

The amount of the added alkaline earth metal salt of aliphatic carboxylic acid in the polyacetal resin composition with respect to 100 parts by mass of the polyacetal polymer (A) is 0.001 to 0.30 parts by mass, and preferably 0.01 to 0.25 parts by mass.

<Hindered Phenol Antioxidant (E)>

In the embodiment of the present invention, a hindered phenol antioxidant (E) may be used as an ordinary antioxidant. The hindered phenol antioxidant (E) is exemplified by commonly used monocyclic hindered phenol compounds, polycyclic hindered phenol compounds having rings linked by a hydrocarbon group or a sulfur-atom-containing group, hindered phenol compounds having an ester group or amide group, and the like, and specifically, commercially available compounds such as the compounds described in Japanese Unexamined Patent Application, Publication No. 2009-286874, that is, IRGANOX 1010, IRGANOX 1035, IRGANOX 1076, IRGANOX 1098, IRGANOX 1135, IRGANOX 1330, IRGANOX 1425, IRGANOX 245, IRGANOX 259, IRGANOX 565, IRGANOX 3114 and the like (each is referred to with its product name; from BASF Japan Ltd.), may be used.

These hindered phenol antioxidants may be used alone or in combination of two or more types thereof. The amount of the added hindered phenol antioxidant with respect to 100 parts by mass of the polyacetal polymer (A) is 0.01 to 3 parts by mass.

<Other Additives>

A compound selected from a metal oxide and a metal hydroxide may be further added to the polyacetal resin composition of the embodiment of the present invention to improve thermal stability, long-term thermal stability, etc. The amount of the compound added with respect to 100 parts by mass of the polyacetal polymer (A) is preferably 0.01 to 1 part by mass.

As the metal oxide and the metal hydroxide, calcium oxide, magnesium oxide, zinc oxide, calcium hydroxide, magnesium hydroxide and the like are preferred.

At least one type of mold release agent selected form an aliphatic carboxylic acid ester, an aliphatic carboxylic acid amide, a polyoxyalkylene glycol, and a silicone compound may be, and preferably is, further added to the polyacetal resin composition of the embodiment of the present invention to improve its molding processability, etc. The amount of the mold release agent added with respect to 100 parts by mass of the polyacetal polymer (A) is preferably 0.01 to 1 part by mass.

One or two or more of a weather (light) stabilizer, an impact resistance modifier, a glossiness control agent, a slidability modifier, a filler, a coloring agent, a nucleating agent, an antistatic agent, a surfactant, an antimicrobial agent, an antifungal agent, an aromatic agent, a foaming agent, a compatibilizer, physical property modifier (boric acid or a derivative thereof, etc.), a fragrance, and the like may be further added to the polyacetal resin composition of the embodiment of the present invention as needed so long as the present invention is not inhibited.

<Production Method of Polyacetal Resin Composition>

A production method of the polyacetal resin composition of the embodiment of the present invention can be prepared according to various methods conventionally known as a preparation method of resin compositions. For example, the following methods can be employed: (1) a method in which all the components constituting the composition are mixed, and the mixture is fed to an extruder and melt-kneaded to obtain the composition in pellet form; (2) a method in which some of the components constituting the composition are fed from a main feed port of an extruder, and the remaining components are fed from a side feed port, and the total mixture is melt-kneaded to obtain the composition in pellet form; (3) a method in which pellets with different compositions are once prepared by extrusion or the like, and then the pellets are mixed to adjust the composition to a predetermined level; and the like.

In preparing the composition using an extruder, it is preferable to use an extruder having one or more devolatilizing vent openings, and further to feed water or a low-boiling-point alcohol in an amount of about 0.1 to 10 parts by mass with respect to 100 parts by mass of the polyacetal polymer at any position from a main feed port to the devolatilizing vent openings, and to devolatilize and remove formaldehyde and other substances generated in the extrusion step, from the devolatilizing vent openings together with water or the low-boiling-point alcohol. This can further reduce the amount of formaldehyde generated from the polyacetal resin composition and a molded article thereof.

The polyacetal resin composition of the embodiment of the present invention prepared in this manner can be molded by various conventionally known molding methods, such as injection molding, extrusion molding, compression molding, vacuum molding, blow molding, and foam molding.

The embodiment of the present invention encompasses the recycling of the polyacetal resin composition and a molded article formed from a polyacetal resin composition colored according to the above. Specifically, the embodiment of the present invention encompasses a recycled resin composition obtained by melt-kneading and extruding a molded article formed from these resin compositions or pulverized products thereof, alone or together with a resin material or molded article of the same or different composition, and, a recycled molded article obtained by melt-kneading and molding a molded article formed from these resin compositions or pulverized products thereof, alone or together with a resin material or molded article of the same or different composition.

Thus, the recycled resin composition and the recycled molded article, which are prepared through a thermal history of repeated melting, also retain an extremely low level of formaldehyde generation, similarly to the polyacetal resin composition on which the recycled resin composition and the recycled molded article are based.

EXAMPLES

Hereinafter, the embodiment of the present invention is specifically explained by way of Examples, but the present invention is not limited thereto. It should be noted that the term "part(s)" in each occurrence in the Examples and Comparative Examples represents parts by mass. The units of the numerical values in the table are parts by mass.
<Preparation of Polyacetal Polymer (A)>
[Copolymerization of Trioxane as Principal Monomer (a) with Cyclic Ether or Cyclic Formal as Comonomer (b)]

A continuous twin-screw polymerizer was used as a polymerization reaction apparatus. This polymerizer was equipped, on the outside thereof, with a jacket for passing heating or cooling medium, and, on the inside thereof, with two rotating shafts with many puddles for agitation and propulsion in the longitudinal direction. Hot water at 80° C. was passed through the jacket of this twin-screw polymerizer, and while the two rotating shafts were rotating at a constant speed, a liquid mixture containing 96.2% by mass of trioxane as a principal monomer (a) and 3.8% by mass of 1,3-dioxolane as a comonomer (b), and containing 1,000 ppm of methylal as a chain transfer agent was continuously fed to one end of the twin-screw polymerizer, and concurrently phosphotungstic acid or phosphomolybdic acid as a polymerization catalyst (c) in an amount of 3 ppm with respect to the total monomers was continuously added to the liquid mixture, to perform copolymerization. In Table 1, the amount of the added polymerization catalyst is expressed as mass ratio (unit: ppm) with respect to the sum of the total monomers.
[Catalyst Deactivation Treatment of Crude Polyacetal Polymer]

The reaction product of the copolymerization (crude polyacetal polymer) was discharged from a discharge port at the other end of the polymerizer, and additionally 20 ppm of sodium stearate as the component (d) shown in the table was added to deactivate the catalyst of the crude polymer, whereby the desired polyacetal polymer (A-1) was prepared. The addition of the component (d) to the polyacetal polymer (A-1), as well as polyacetal polymers (A-2) to (A-6), which serve as other Examples or Comparative Examples, was performed as follows.

If "solid" is designated in a cell in the column titled "addition method" in Table 1, the component (d) in a solid state was uniformly dispersed in a powder of the stabilization-treated polyacetal polymer, and thereafter the powder following the dispersion was added to the reaction product as described above. If "aqueous solution" is designated in a cell in the column titled "addition method" in Table 1, a 10% by mass aqueous solution containing the component (d) was prepared, the aqueous solution was then added to a powder of the stabilization-treated polyacetal polymer so as to achieve a predetermined amount of the component (d) to be added, and the powder following dispersion was added to the reaction product. The term "amount" in Table 1 represents a mass ratio (unit: ppm) of the component (d) to the crude polyacetal polymer.
<Preparation of Polyacetal Resin Composition>
[Melt Kneading with Components (B), (C) and (D)]

To the polyacetal polymer (A) prepared as described above, the aliphatic carboxylic acid hydrazide (B), the hydantoin compound (C) and the alkaline earth metal salt of aliphatic carboxylic acid (D) shown in the tables were added in the amounts specified in the tables, and the mixture was melt-kneaded and extruded using a twin-screw extruder with a vent at a temperature of 220° C. under a degree of vacuum at the vent of 5 mmHg, to prepare resin compositions of the polyacetal polymers according to Examples and Comparative Examples in pellet form. Incidentally, in all the samples, a hindered phenol antioxidant (E), more specifically ethylenebis(oxyethylene)bis[3-(5-tert-butyl-4-hydroxy-m-tolyl) propionate] (IRGANOX 245 from BASF Japan Ltd.) in an amount of 0.35 parts by mass with respect to 100 parts by mass of the polyacetal polymer (A) component was added in the melt- kneading and extrusion.
<<Each Component>>

Each component used in the Examples and Comparative Examples and listed in the tables is as follows:
Polyacetal Polymer (A)
Listed in Table 1
(b) Comonomer
DO: 1,3-dioxolane
(c) Polymerization catalyst
PWA: phosphotungstic acid
PMA: phosphomolybdic acid
Aliphatic carboxylic acid hydrazide (B)
B-1: sebacic acid dihydrazide
B-2: adipic acid dihydrazide
B-3: dodecanedioic acid dihydrazide
Hydantoin Compound (C)
C-1: 1,3-bis(hydrazinocarbonoethyl)-5-isopropylhydantoin ("AJICURE" VDH from Ajinomoto Fine-Techno Co., Inc.)
Alkaline Earth Metal Salt of Aliphatic Carboxylic Acid (D)
D-1: calcium stearate
D-2: calcium 12-hydroxystearate
<Evaluation>

The characteristics evaluation items and evaluation methods in Examples and Comparative Examples are as follows.
<Evaluation of Formaldehyde Generation (VOC) from Molded Article>

Each of the polyacetal resin compositions prepared in Examples and Comparative Examples were used to mold flat test pieces (100 mm×40 mm×2 mmt) under the conditions described below. Two of these flat test pieces were sealed in a 10 L sampling bag made from polyvinyl fluoride, and the sampling bag was degassed, and 4 L of nitrogen gas was charged thereinto. The bag was heated at 65° C. for 2 hours, then 3 L of the nitrogen inside the sampling bag was taken out at a rate of 0.5 mL/min, and the generated formaldehyde was allowed to be adsorbed on a DNPH (2,4-dinitrophenylhydrazine) collecting tube (Sep-Pak DNPH-Silica from Waters).

Subsequently, the reaction product of DNPH and formaldehyde was extracted from the DNPH collecting tube with acetonitrile, and the amount of the generated formaldehyde was determined according to a calibration curve method using a standard of the reaction product of DNPH and formaldehyde using a high performance liquid chromatograph. Then, the amount of the generated formaldehyde (μg/g) per unit mass of the test piece was calculated.

Molding Machine: FANUC ROBOSHOT α-S100ia (FANUC CORPORATION)
Molding Conditions: Cylinder Temperature (° C.) Nozzle-C1-C2-C3

| 190 190 180 160° C. | |
|---|---|
| Injection pressure | 60 (MPa) |
| Injection speed | 1.0 (m/min) |
| Mold temperature | 80 (° C.) |

<Evaluation of Mold Deposits (MD)>
Each of the polyacetal resin compositions prepared in Examples and Comparative Examples were used to mold mold deposit test pieces (33 mm×23 mm×1 mmt) under the conditions described below.
[Evaluation Method]
After 5,000 shots of continuous molding, the surface of the cavity in the mold was visually observed, and the amount of adhering materials was visually judged in accordance with the following criteria.

A: No adhering material was observed at all.
B: Almost no adhering material was observed.
C: Adhering materials were partially observed.
D: Adhering materials were observed throughout the entire surface.
E: A large amount of adhering materials were observed throughout the entire surface.

Molding Machine: FANUC ROBOSHOT S-2000i 50B (FANUC CORPORATION)
Molding Conditions: Cylinder Temperature (° C.) Nozzle-C1-C2-C3

| 205 215 205 185° C. | |
|---|---|
| Injection pressure | 40 (MPa) |
| Injection speed | 1.5 (m/min) |
| Mold temperature | 80 (° C.) |

TABLE 1

| | | (b) | | (c) | | (d) | | |
|---|---|---|---|---|---|---|---|---|
| | Type | Type | Mass % | Type | Amount ppm | Type | Amount ppm | Addition method |
| (A)Polyacetal polymer | A-1 | DO | 3.8 | PWA | 3 | Sodium stearate | 20 | Solid |
| | A-2 | DO | 3.8 | PWA | 3 | Sodium hydrogencarbonate | 10 | Solid |
| | A-3 | DO | 3.8 | PMA | 3 | Sodium hydroxide | 10 | Aqueous solution |
| | A-4 | DO | 3.8 | PWA | 3 | Melamine | 700 | Solid |
| | A-5 | DO | 3.8 | PWA | 3 | Melamine resin | 700 | Solid |
| | A-6 | DO | 3.8 | PMA | 3 | Benzoguanamine | 700 | Solid |

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A)Polyacetal polymer | A-1 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 | | |
| (B)Adipic acid dihydrazide | B-2 | | | | | | | | | | 0.25 | |
| (B)Dodecanedioic acid dihydrazide | B-3 | | | | | | | | | | | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 | | 0.05 | 0.05 | 0.05 | 0.05 | 0.2 | 0.005 | 0.05 | 0.05 | 0.05 |
| (D)Calcium 12-hydroxystearate | D-2 | | 0.05 | | | | | | | | | |
| VOC(μg/g) | | 0.01 | 0.03 | 0.01 | 0.01 | 0.01 | 0.01 | 0.05 | 0.01 | 0.30 | 0.02 | 0.02 |
| MD | | A | A | A | A | A | A | A | A | A | B | B |

TABLE 3

| | | Comparative Example | | | | | | |
|---|---|---|---|---|---|---|---|---|
| | | 1 | 2 | 3 | 4 | 5 | 6 | 7 |
| (A)Polyacetal polymer | A-1 | 100 | 100 | 100 | 100 | 100 | 100 | 100 |
| (B)Sebacic acid dihydrazide | B-1 | 0.25 | | 0.55 | 0.005 | 0.45 | 0.25 | 0.25 |
| (B)Adipic acid dihydrazide | B-2 | | | | | | | |
| (B)Dodecanedioic acid dihydrazide | B-3 | | | | | | | |
| (C)1,3-Bis(hydrazinocarbonoethyl)-5-isopropylhydantoin | C-1 | | 0.60 | 0.05 | 0.50 | 0.25 | 0.05 | 0.10 |

TABLE 3-continued

|  |  | Comparative Example | | | | | | |
|---|---|---|---|---|---|---|---|---|
|  |  | 1 | 2 | 3 | 4 | 5 | 6 | 7 |
| (D)Calcium stearate | D-1 | 0.05 | 0.05 | 0.05 | 0.05 | 0.05 |  | 0.5 |
| (D)Calcium 12-hydroxystearate | D-2 |  |  |  |  |  |  |  |
| VOC(μg/g) |  | 0.04 | 0.02 | 0.01 | 0.02 | 0.01 | 0.03 | 0.6 |
| MD |  | D | C | E | C | D | E | C |

TABLE 4

|  |  | Example | | | | | | | | | | |
|---|---|---|---|---|---|---|---|---|---|---|---|---|
|  |  | 12 | 13 | 14 | 15 | 16 | 17 | 18 | 19 | 20 | 21 | 22 |
| (A)Polyacetal polymer | A-2 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 |  |  |
| (B)Adipic acid dihydrazide | B-2 |  |  |  |  |  |  |  |  |  | 0.25 |  |
| (B)Dodecanedioic acid dihydrazide | B-3 |  |  |  |  |  |  |  |  |  |  | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 |  | 0.05 | 0.05 | 0.05 | 0.05 | 0.2 | 0.005 | 0.05 | 0.05 | 0.05 |
| (D)Calcium 12-hydroxystearate | D-2 |  | 0.05 |  |  |  |  |  |  |  |  |  |
| VOC(μg/g) |  | 0.02 | 0.04 | 0.02 | 0.01 | 0.01 | 0.02 | 0.06 | 0.03 | 0.50 | 0.04 | 0.05 |
| MD |  | A | A | A | A | A | A | A | A | A | B | B |

TABLE 5

|  |  | 8 | 9 | 10 | 11 | 12 | 13 | 14 |
|---|---|---|---|---|---|---|---|---|
| (A)Polyacetal polymer | A-2 | 100 | 100 | 100 | 100 | 100 | 100 | 100 |
| (B)Sebacic acid dihydrazide | B-1 | 0.25 |  | 0.55 | 0.005 | 0.45 | 0.25 | 0.25 |
| (B)Adipic acid dihydrazide | B-2 |  |  |  |  |  |  |  |
| (B)Dodecanedioic acid dihydrazide | B-3 |  |  |  |  |  |  |  |
| (C)1,3-Bis(hydrazinocarbonoethyl)-5-isopropylhydantoin | C-1 |  | 0.60 | 0.05 | 0.50 | 0.25 | 0.05 | 0.10 |
| (D)Calcium stearate | D-1 | 0.05 | 0.05 | 0.05 | 0.05 | 0.05 |  | 0.5 |
| (D)Calcium 12-hydroxystearate | D-2 |  |  |  |  |  |  |  |
| VOC(μg/g) |  | 0.06 | 0.03 | 0.01 | 0.03 | 0.01 | 0.06 | 0.8 |
| MD |  | D | C | E | C | D | E | C |

TABLE 6

|  |  | Example | | | | | | | | | | |
|---|---|---|---|---|---|---|---|---|---|---|---|---|
|  |  | 23 | 24 | 25 | 26 | 27 | 28 | 29 | 30 | 31 | 32 | 33 |
| (A)Polyacetal polymer | A-3 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 |  |  |
| (B)Adipic acid dihydrazide | B-2 |  |  |  |  |  |  |  |  |  | 0.25 |  |
| (B)Dodecanedioic acid dihydrazide | B-3 |  |  |  |  |  |  |  |  |  |  | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 |  | 0.05 | 0.05 | 0.05 | 0.05 | 0.2 | 0.005 | 0.05 | 0.05 | 0.05 |
| (D)Calcium 12-hydroxystearate | D-2 |  | 0.05 |  |  |  |  |  |  |  |  |  |
| VOC(μg/g) |  | 0.03 | 0.04 | 0.02 | 0.02 | 0.02 | 0.03 | 0.07 | 0.04 | 0.50 | 0.04 | 0.05 |
| MD |  | A | A | A | A | A | A | A | A | A | B | B |

TABLE 7

| | | Comparative Example | | | | | | |
|---|---|---|---|---|---|---|---|---|
| | | 15 | 16 | 17 | 18 | 19 | 20 | 21 |
| (A)Polyacetal polymer | A-3 | 100 | 100 | 100 | 100 | 100 | 100 | 100 |
| (B)Sebacic acid dihydrazide | B-1 | 0.25 | | 0.55 | 0.005 | 0.45 | 0.25 | 0.25 |
| (B)Adipic acid dihydrazide | B-2 | | | | | | | |
| (B)Dodecanedioic acid dihydrazide | B-3 | | | | | | | |
| (C)1,3-Bis(hydrazinocarbonoethyl)-5-isopropylhydantoin | C-1 | | 0.60 | 0.05 | 0.50 | 0.25 | 0.05 | 0.10 |
| (D)Calcium stearate | D-1 | 0.05 | 0.05 | 0.05 | 0.05 | 0.05 | | 0.5 |
| (D)Calcium 12-hydroxystearate | D-2 | | | | | | | |
| VOC(μg/g) | | 0.06 | 0.04 | 0.02 | 0.04 | 0.02 | 0.07 | 0.9 |
| MD | | D | C | E | C | D | E | C |

TABLE 8

| | | Comparative Example | | | | | | | | | | |
|---|---|---|---|---|---|---|---|---|---|---|---|---|
| | | 22 | 23 | 24 | 25 | 26 | 27 | 28 | 29 | 30 | 31 | 32 |
| (A)Polyacetal polymer | A-4 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 | | |
| (B)Adipic acid dihydrazide | B-2 | | | | | | | | | | 0.25 | |
| (B)Dodecanedioic acid dihydrazide | B-3 | | | | | | | | | | | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 | | 0.05 | 0.05 | 0.05 | 0.05 | 0.2 | 0.005 | 0.05 | 0.05 | 0.05 |
| (D)Calcium 12-hydroxystearate | D-2 | | 0.05 | | | | | | | | | |
| VOC(μg/g) | | 1.38 | 1.70 | 1.03 | 1.34 | 1.26 | 1.45 | 1.71 | 1.63 | 3.98 | 1.30 | 1.81 |
| MD | | D | D | E | C | D | E | C | D | C | E | E |

TABLE 9

| | | Comparative Example | | | | | | | | | | |
|---|---|---|---|---|---|---|---|---|---|---|---|---|
| | | 33 | 34 | 35 | 36 | 37 | 38 | 39 | 40 | 41 | 42 | 43 |
| (A)Polyacetal polymer | A-5 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 | | |
| (B)Adipic acid dihydrazide | B-2 | | | | | | | | | | 0.25 | |
| (B)Dodecanedioic acid dihydrazide | B-3 | | | | | | | | | | | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 | | 0.05 | 0.05 | 0.05 | 0.05 | 0.2 | 0.005 | 0.05 | 0.05 | 0.05 |
| (D)Calcium 12-hydroxystearate | D-2 | | 0.05 | | | | | | | | | |
| VOC(μg/g) | | 4.20 | 5.54 | 3.98 | 3.91 | 1.81 | 3.95 | 1.91 | 3.29 | 2.85 | 3.71 | 4.37 |
| MD | | C | D | E | C | D | E | C | D | C | E | E |

TABLE 10

| | | Comparative Example | | | | | | | | | | |
|---|---|---|---|---|---|---|---|---|---|---|---|---|
| | | 44 | 45 | 46 | 47 | 48 | 49 | 50 | 51 | 52 | 53 | 54 |
| (A)Polyacetal polymer | A-6 | 100 | 100 | 100 | 100 | 100 | 100 | 100 | 100 | 100 | 100 | 100 |
| (B)Sebacic acid dihydrazide | B-1 | 0.25 | 0.25 | 0.35 | 0.05 | 0.25 | 0.30 | 0.25 | 0.25 | 0.05 | | |
| (B)Adipic acid dihydrazide | B-2 | | | | | | | | | | 0.25 | |
| (B)Dodecanedioic acid dihydrazide | B-3 | | | | | | | | | | | 0.25 |
| (C)1,3-Bis(hydrazinocarbonoethyl)-5-isopropylhydantoin | C-1 | 0.05 | 0.05 | 0.05 | 0.45 | 0.25 | 0.005 | 0.05 | 0.05 | 0.01 | 0.05 | 0.05 |
| (D)Calcium stearate | D-1 | 0.05 | | 0.05 | 0.05 | 0.05 | 0.05 | 0.2 | 0.005 | 0.05 | 0.05 | 0.05 |
| (D)Calcium 12-hydroxystearate | D-2 | | 0.05 | | | | | | | | | |
| VOC(μg/g) | | 2.54 | 2.79 | 1.51 | 2.85 | 2.75 | 3.19 | 3.67 | 2.87 | 2.89 | 2.56 | 3.26 |
| MD | | D | D | E | C | D | E | C | D | C | E | E |

The invention claimed is:

1. A method for producing a polyacetal resin composition, the method comprising:

producing a polyacetal polymer (A) by copolymerizing trioxane as a principal monomer (a) with one or more types of compounds selected from a cyclic ether having at least one carbon-carbon bond and a cyclic formal having at least one carbon-carbon bond as a comonomer (b) using a heteropolyacid represented by general formula (1) as a polymerization catalyst (c) to obtain a reaction product, adding a carbonate, hydrogen carbonate, or carboxylate of an alkali metal element or an alkaline earth metal element, or a hydrate thereof, or a hydroxide of an alkali metal element or an alkaline earth metal element (d) to the reaction product to obtain a mixture, and subjecting the mixture to melt kneading treatment to deactivate the polymerization catalyst (c), wherein general formula (1) is $H_m[M^1_x \cdot M^2_y Oz] \cdot nH_2O$ wherein in the formula (1), $M^1$ represents a central element consisting of one type or two types of elements selected from P and Si;

$M^2$ represents at least one coordination element selected from W, Mo and V;

x represents an integer of 1 or greater and 10 or less; y represents an integer of 6 or greater and 40 or less; z represents an integer of 10 or greater and 100 or less; m represents an integer of 1 or greater; and n represents an integer of 0 or greater and 50 or less; and melt-kneading 100 parts by mass of the polyacetal polymer (A) with:

0.05 to 0.35 parts by mass of an aliphatic carboxylic acid hydrazide (B) having 6 to 12 carbon atoms;

0.005 to 0.45 parts by mass of a hydantoin compound having two hydrazinocarbonylalkyl groups (C); and 0.005 to 0.2 parts by mass of a calcium salt of aliphatic carboxylic acid (D), wherein the aliphatic carboxylic acid hydrazide (B) is sebacic acid dihydrazide, adipic acid dihydrazide or dodecanedioic acid dihydrazide, wherein a total amount of the components (B) and (C) with respect to 100 parts by mass of the polyacetal polymer (A) is 0.03 to 0.55 parts by mass.

2. The method for producing a polyacetal resin composition according to claim 1, wherein the alkaline earth metal salt of aliphatic carboxylic acid (D) is at least one selected from calcium stearate and calcium 12-hydroxystearate.

3. The method for producing a polyacetal resin composition according to claim 1, wherein the hydantoin compound having two hydrazinocarbonylalkyl groups (C) is 1,3-bis(hydrazinocarbonyethyl)-5-isopropylhydantoin.

4. The method according to claim 1, wherein the hydrazinocarbonylalkyl groups are hydrazinocarbonylpropyl groups.

* * * * *